United States Patent [19]

Coran et al.

[11] 4,338,411

[45] Jul. 6, 1982

[54] MODIFIED RESINS

[75] Inventors: Aubert Y. Coran; Raman Patel, both of Akron, Ohio

[73] Assignee: Monsanto Company, St. Louis, Mo.

[21] Appl. No.: 238,339

[22] Filed: Feb. 26, 1981

[51] Int. Cl.³ .............................................. C08L 23/26
[52] U.S. Cl. ................................................... 525/145
[58] Field of Search ......................... 525/133, 145, 143

[56] References Cited

U.S. PATENT DOCUMENTS

| | | | |
|---|---|---|---|
| 3,211,804 | 10/1965 | Baum | 525/143 |
| 3,264,272 | 8/1966 | Rees | 260/78.5 |
| 3,322,734 | 5/1967 | Rees | 260/79.3 |
| 3,454,676 | 7/1969 | Busse | 260/897 |
| 3,909,463 | 9/1975 | Hartman | 260/2.5 F |

FOREIGN PATENT DOCUMENTS 872267 7/1961 United Kingdom ................ 525/139

*Primary Examiner*—William F. Hamrock
*Assistant Examiner*—Peter F. Kulkosky
*Attorney, Agent, or Firm*—Larry R. Swaney

[57] ABSTRACT

Improved carboxy containing ethylene polymer resins are described which are obtained by reaction with dimethylol phenolic compound.

8 Claims, No Drawings

MODIFIED RESINS

This invention relates to carboxy containing ethylene polymer resins which have been modified with dimethylol phenolic compound.

BACKGROUND OF THE INVENTION

Carboxy containing ethylene polymer resins may be ionically crosslinked by partially or completely neutralizing the acid groups with metal ions. These metal salts of carboxy containing ethylene polymer resins are called ionomer resins. Thus, ionomer resins are ionically crosslinked ethylene/acid copolymers having thermally labile crosslinks, i.e., at elevated temperatures the crosslinks are broken; this permits processing the heated resin as a thermoplastic. Upon cooling, the crosslinks reform to transform the fluid mass to a solidified mass exhibiting properties substantially the same as the original material. Carboxy containing ethylene polymer resins and ionomer resins cannot be used in applications where parts under load are exposed to highly elevated temperatures because the materials tend to creep. If the tendency to creep at elevated temperatures could be overcome, wider use of these resins would result.

SUMMARY OF THE INVENTION

It has been found that a thermoplastic carboxy containing ethylene polymer (CEP) resin may be modified by reaction with a dimethylol phenolic compound. The CEP resin can be partially or completely neutralized. This form, called an ionomer, is also considered, herein, to be a CEP resin. The modified CEP resin exhibits improved properties including greater high temperature creep resistance, yet, it is still processable as a thermoplastic. The amount of dimethylol phenolic compound varies, depending upon the type of CEP resin, the type of dimethylol phenolic compound, the reaction conditions including temperature, and the properties desired in the dimethylol phenolic compound modified CEP resin. Suitable amounts of dimethylol phenolic compound range from an amount sufficient to improve creep properties, to less than a thermosetting amount which would render the modified CEP resin no longer processable as a thermoplastic. Generally, 0.2–20 parts by weight of dimethylol phenolic compound per 100 parts by weight of CEP resin are satisfactory, with 0.5–10 parts by weight being preferred.

The modified CEP resins of the invention may be prepared by heating a mixture of CEP resin and dimethylol phenolic compound. Preferably, the CEP resin is masticated by using conventional mixing equipment such as a rubber mill, Brabender mixer, Banbury mixer or mixing extruder for a time and temperature to melt the CEP resin. The dimethylol phenolic compound is then added and mastication is continued until reaction with the molten CEP resin is complete (generally 1–10 minutes). Reaction temperatures up to about 300° C. or higher are satisfactory with reaction temperatures between about 150° C. to 250° C. being preferred. The modified CEP resin is processable as a conventional thermoplastic, i.e., by calendering, injection molding, extrusion, and compression molding. The modified CEP resin exhibits improved creep resistance. A preferred modified CEP resin exhibits at least a 50% reduction in percent creep at 100° C., as compared to the unmodified CEP resin.

Suitable dimethylol phenolic compound may be prepared by condensation of an alkyl ($C_1$–$C_{10}$) substituted phenol, halogen substituted phenol or unsubstituted phenol with an aldehyde, preferably formaldehyde, in an alkaline medium or by condensation of phenoldialcohols. Dimethylol phenols substituted in the para-position with $C_5$–$C_{10}$ alkyl groups are preferred. Suitable dimethylol phenolic compounds include halogenated, preferably brominated, dimethylol phenols (unsubstituted or alkyl substituted) giving products containing about 2–10 weight percent bromine. "Dimethylol phenolic compound" includes polymeric phenols containing up to 10 benzene rings but preferred compounds contain no more than three benzene rings. Satisfactory dimethylol phenolic compounds are described in U.S. Pat. No. 3,909,463, Col. 3, lines 57–68 and Col. 4, lines 1–58 which disclosure is incorporated herein by reference. Suitable dimethylol phenolic compounds, also known as phenolic curing resins for rubber, are commercially available, for example, such resins may be purchased under the trade names CRJ-352, SP-1045, SP-1055, and SP-1056 from Schenectady Chemicals, Inc. Similar functionally equivalent phenolic curing resins may be obtained from other suppliers. It is understood that only heat reactive phenol formaldehyde resins are suitable for this invention, which material should not be confused with non-heat reactive phenol formaldehyde resins.

Carboxy containing ethylene polymer (herein abbreviated CEP) resins suitable for the practice of the invention may be prepared by polymerization of ethylene and ethenically unsaturated mono- or dicarboxylic acid of 3–8 carbon atoms. The ratio of ethylene to olefinic acid may be varied over a wide range, but preferred resins comprise at least 50 mole percent of ethylene. More preferred CEP resins comprise polymers containing about 1 to 20 weight percent of olefinic acid. Acrylic acid and methacrylic acid are preferred acids. Satisfactory CEP resins are commercially available from Dow Chemical Company under the tradename EEA resin.

Partially or completely neutralizing the acid groups of CEP resin with metal ions give thermoplastic ionomer resin. Examples of thermoplastic ionomer resins suitable for the practice of the invention are described in U.S. Pat. Nos. 3,264,272 and 3,322,734, the disclosures of which are incorporated herein by reference. Particular attention is called to the descriptions of Columns 2 through 6 of U.S. Pat. No. 3,264,272 and Columns 1 through 4 of U.S. Pat. No. 3,322,734. A preferred ionomer resin is a copolymer of ethylene and methacrylic acid neutralized with sodium or zinc ion. Satisfactory ionomer resins are commercially available from duPont Company under the tradename Surlyn.

The properties of the phenolic compound modified ionomer resin of the invention may be further modified by the addition of materials which are conventional in the compounding of plastics and blends thereof. Examples of such materials include particulate fillers such as carbon black, clay, silica, magnesia, titanium dioxide, liquid fillers such as hydrocarbon plasticizers and organic acid ester plasticizers, stabilizers, flame retarders, antioxidants, antiozonants, processing aids, organic or inorganic discontinuous fibers and coupling agents such as vinyl silanes and titanates. For examples of satisfactory plasticizers, see U.S. Pat. No. 3,847,854.

The modified CEP resins of the invention are useful for making a variety of articles such as tubing, belts, gaskets, moldings and molded parts. They are particularly useful for making articles by extrusion, injection molding, compression molding and calendering. They are also useful for blending with thermoplastic polymers, for example, improved blends are obtained by replacing the ionomer resin of the blends of ionomer resin and elastomers described in U.S. Pat. No. 3,454,676 with modified CEP resin or modified ionomer resin of this invention. The modified CEP resins are also useful as polymer capatibilizers, i.e., they can enhance the capability of inherently incompatible polymers or moderately compatible polymers.

The stress-strain properties of compositions of this invention are determined by ASTM procedure D-1708-66. Specimens are pulled with an Instron tester at 2.54 cm. per minute up to 30% elongation and then 25.4 cm. per minute to failure. Creep resistance is measured by hanging a test specimen under constant load in an oven at a given temperature for 10 minutes. The specimen is removed and cooled under tension and the distance between two marks on the specimen is measured. The original distance between the two gauge marks is 2.24 cm. A test specimen is about 0.47 cm. wide and about 0.19 cm. thick and is loaded with a weight of about 20-21 grams to give a force of about 0.22-0.23 Kg./cm.$^2$. Percent creep is calculated by dividing the after-creep gauge mark distance by the original gauge mark distance and then multiplying the quotient by 100 and subtracting 100.

DESCRIPTION OF THE PREFERRED EMBODIMENTS

Compositions of the invention are prepared by charging CEP resin or ionomer resin and dimethylol phenolic compound into a Brabender mixer. The materials are masticated until a homogeneous mass is obtained. The mixing speed is varied to maintain the indicated mixing temperature. The mass is removed from the mixer, cooled and then specimens are compression molded. Ionomer resin is purchased under the Surlyn tradename. Surlyn® 1652 is a zinc cation neutralized ethylene/methacrylic acid copolymer having a melt flow index of 5.0 decigrams per minute. Surlyn® 1554 is a zinc cation neutralized ethylene/methacrylic acid copolymer having a melt flow index of 1.0. Surlyn® 1606 is a sodium cation neutralized ethylene/methacrylic acid copolymer having a melt flow index of 3.0. SP-1045 is a dimethylol p-octylphenol. SP-1056 is brominated dimethylol phenolic curing resin. EEA resin 435 is an ethylene acrylic acid copolymer containing 3.5% acrylic acid and having a melt index of 11. EEA resin 455 is an ethylene acrylic acid copolymer containing 8% acrylic acid and having a melt index of 5.5. The EEA resins are not neutralized.

Compositions of the invention containing ionomer resin are illustrated in Table 1. Stocks 1, 5 and 7 are unmodified ionomer resins which are included as controls. The data show substantial improvements in creep resistance as a result of modifying ionomer resin with dimethylol phenolic compound. The data indicates that nonhalogenated dimethylol phenolic compound gives better creep resistance than halogenated phenolic compound. All compositions are processable as thermoplastics.

Compositions of the invention containing CEP resins, which are not neutralized, are illustrated in Table 2. Stocks 1 and 5 are controls of unmodified CEP resins. The mixing temperature is about 220° C. and the molding temperature is 225° C. In Stock 9, 4 parts by weight of sodium bicarbonate are added to convert the CEP resin to an ionomer resin by neutralizing the acid groups. The data show improvements in tensile properties and creep resistance as a result of modifying CEP resin with dimethylol phenolic compound.

TABLE 1

| Stock | 1 | 2 | 3 | 4 | 5 | 6 | 7 | 8 | 9 |
|---|---|---|---|---|---|---|---|---|---|
| (Parts by Weight) | | | | | | | | | |
| Surlyn 1652 | 100 | 100 | 100 | 100 | — | — | — | — | — |
| Surlyn 1554 | — | — | — | — | 100 | 100 | — | — | — |
| Surlyn 1606 | — | — | — | — | — | — | 100 | 100 | 100 |
| SP-1045 | — | 2.5 | — | — | — | 2.0 | — | 1.0 | 2.0 |
| SP-1056 | — | — | 2.5 | 5.0 | — | — | — | — | — |
| Mixing Temp., °C. | — | 180 | 180 | 180 | — | 180 | — | 225 | 180 |
| Mold Temp., °C. | 210 | 210 | 210 | 210 | 220 | 220 | 200 | 250 | 220 |
| Properties | | | | | | | | | |
| TS, MPa | 18.9 | 23.9 | 23.4 | 25.7 | 25.8 | 29.8 | 23.4 | 23.2 | 28.2 |
| $M_{100}$, MPa | 9.9 | 10.7 | 11.6 | 11.4 | 19.4 | 20.5 | 10.6 | 11.3 | 15.9 |
| E, MPa | 118 | 87 | 104 | 89 | 298 | 223 | 96.2 | 102 | 246 |
| UE, % | 460 | 400 | 440 | 430 | 320 | 270 | 560 | 460 | 380 |
| Tension Set, % | 27 | 22 | 24 | 22 | 44 | 38 | 28 | 27 | 33 |
| TSB, MPa | 106 | 119 | 126 | 136 | 107 | 110 | 155 | 129 | 135 |
| Shore D | 52 | 49 | 50 | 48 | 55 | 55 | 50 | 44 | 54 |
| Creep, % | | | | | | | | | |
| @ 100° C. | 15 | 6 | 8 | 8 | 68 | 20 | ∞ | 13 | 34 |
| @ 121° C. | 650 | 42 | ∞ | 71 | ∞ | 249 | | ∞ | ∞ |
| @ 136° C. | ∞ | 343 | | 315 | | ∞ | | | |

TABLE 2

| | 1 | 2 | 3 | 4 | 5 | 6 | 7 | 8 | 9 |
|---|---|---|---|---|---|---|---|---|---|
| EEA Resin 435 | 100 | 100 | 100 | 100 | — | — | — | — | — |
| EEA Resin 455 | — | — | — | — | 100 | 100 | 100 | 100 | 100 |
| SP-1045 | — | 1.25 | 2.5 | 5.0 | — | 1.25 | 2.5 | 5.0 | 5.0 |
| NaHCO$_3$ | — | — | — | — | — | — | — | — | 4.0 |
| Properties | | | | | | | | | |
| TS, MPa | 12.9 | 17.2 | 19.1 | 18.7 | 19.2 | 22.0 | 23.6 | 22.0 | 27.6 |
| $M_{100}$, MPa | 8.4 | 8.2 | 8.4 | 8.3 | 9.0 | 8.6 | 8.7 | 8.4 | 12.4 |
| E, MPa | 87 | 83 | 77 | 64 | 72 | 59 | 56 | 46 | 108 |
| UE, % | 490 | 590 | 530 | 470 | 570 | 540 | 490 | 410 | 420 |

TABLE 2-continued

|  | 1 | 2 | 3 | 4 | 5 | 6 | 7 | 8 | 9 |
|---|---|---|---|---|---|---|---|---|---|
| Tension Set, % | 30 | 28 | 27 | 25 | 24 | 21 | 19 | 18 | 24 |
| TSB, MPa | 76 | 118 | 120 | 106 | 129 | 141 | 140 | 113 | 144 |
| Shore D | 45 | 40 | 40 | 37 | 45 | 40 | 39 | 38 | 46 |
| Creep, % |  |  |  |  |  |  |  |  |  |
| @ 100° C. | 9 | 7 | 7 | 6 | ∞ | 5 | 14 | 7 | 19 |
| @ 110° C. | ∞ | ∞ | 161 | 22 |  | ∞ | 51 | 12 | 28 |
| @ 120° C. |  |  | ∞ | 85 |  |  | ∞ | 30 | 76 |
| @ 130° C. |  |  |  | ∞ |  |  |  | 87 | 170 |

The data indicate that optimum tensile properties are obtained with 2.5 parts by weight of methylol phenolic compound. All compositions are processable as thermoplastics.

The data of Tables 1 and 2 indicate that, in addition to giving compositions of reduced creep at a given elevated temperature, dimethylol phenolic modification also gives compositions of higher use temperatures. The temperature of infinite creep or complete flow is increased in each case, due to dimethylol phenol modification; flow temperatures are increased by 10 to over 40 degrees in comparison with unmodified control compositions.

Although the invention has been illustrated by typical examples, it is not limited thereto. Changes and modifications of the examples of the invention herein chosen for purposes of disclosure can be made which do not constitute departure from the spirit and scope of the invention.

We claim:

1. A thermoplastic modified ionomer resin prepared by reaction of an ionic copolymer of ethylene and ethenically unsaturated mono- or dicarboxylic acid of 3–8 carbon atoms in which the acid groups of copolymer are neutralized with metal ions with 0.2–20 parts by weight of dimethylol phenolic compound per 100 parts by weight of said resin.

2. The modified ionomer resin of claim 1 in which the amount of dimethylol phenolic compound is 0.5–10 parts by weight of said resin which modified ionomer resin is thermoplastic.

3. The modified ionomer resin of claim 2 in which the ionomer resin is derived from a copolymer of at least 50 mole percent of ethylene and about 1 to 20 weight percent of methacrylic acid.

4. The modified ionomer resin of claim 3 in which the phenolic compound is dimethylol-p-octylphenol.

5. The modified ionomer resin of claim 4 in which the metal ion is zinc.

6. The modified ionomer resin of claim 2, which exhibits at least a 50% reduction in percent creep at 100° C. compared to the unmodified ionomer resin.

7. The modified ionomer resin of claim 5, which exhibits at least a 50% reduction in percent creep at 100° C. compared to the unmodified ionomer resin.

8. The modified ionomer resin of claim 4 in which the metal ion is sodium.

* * * * *